US012091822B2

(12) United States Patent
Müller et al.

(10) Patent No.: US 12,091,822 B2
(45) Date of Patent: Sep. 17, 2024

(54) SYSTEM, METHOD AND SUPPORT ELEMENT FOR ACTIVELY DAMPING ACOUSTIC VIBRATIONS OF A RAIL FOR RAIL TRAFFIC

(71) Applicant: STABILUS GMBH, Koblenz (DE)

(72) Inventors: Markus Müller, Koblenz (DE); Joshua Burrell, Nörtershausen (DE); Alexander Hüsch, Dreifelden (DE); Marian Bochen, Eitelborn (DE); Luis De Jesus, Swansea, MA (US)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 17/768,031

(22) PCT Filed: Oct. 7, 2020

(86) PCT No.: PCT/EP2020/078066
§ 371 (c)(1),
(2) Date: Apr. 11, 2022

(87) PCT Pub. No.: WO2021/073963
PCT Pub. Date: Apr. 22, 2021

(65) Prior Publication Data

US 2024/0093435 A1 Mar. 21, 2024

(30) Foreign Application Priority Data

Oct. 15, 2019 (DE) ......................... 102019127824.4

(51) Int. Cl.

| | |
|---|---|
| ***E01B 9/00*** | (2006.01) |
| ***E01B 19/00*** | (2006.01) |
| ***G10K 11/178*** | (2006.01) |

(52) U.S. Cl.
CPC ...... *E01B 19/003* (2013.01); *G10K 11/17873* (2018.01); *G10K 2210/1283* (2013.01); *G10K 2210/1291* (2013.01)

(58) Field of Classification Search
CPC ............ E01B 19/003; G10K 11/17873; G10K 2210/1283; G10K 2210/1291
(Continued)

(56) References Cited

U.S. PATENT DOCUMENTS

| | | | | |
|---|---|---|---|---|
| 5,237,618 A * | 8/1993 | Bethel | G10K 11/17873 381/71.8 |
| 2011/0035122 A1* | 2/2011 | Katrak | F16H 59/70 701/51 |
| 2021/0278309 A1* | 9/2021 | Lefebvre | B60T 17/221 |

FOREIGN PATENT DOCUMENTS

| | | |
|---|---|---|
| CN | 110144770 A | 8/2019 |
| DE | 42 12 782 A1 | 10/1993 |

(Continued)

OTHER PUBLICATIONS

International Search Report for PCT/EP2020/078066 issued on Jan. 22, 2021.

*Primary Examiner* — Vivian C Chin
*Assistant Examiner* — Douglas J Suthers
(74) *Attorney, Agent, or Firm* — Schmeiser, Olsen & Watts, LLP

(57) ABSTRACT

A system for actively attenuating acoustic vibrations of a rail for rail traffic is provided including at least one sensor for detecting at least a vertical acoustic vibration of the rail, at least one actuator for exciting at least a vertical counter-vibration of the rail and at least one control unit communicatively connected to the at least one sensor and the at least one actuator for controlling the at least one actuator depending on the vibration detected by the sensor, the counter-vibration being adapted to destructively interfere with the
(Continued)

detected vibration, and the at least one actuator being mechanically coupled to the rail and to a carrier element supporting the rail. Also provided is a carrier element for the system and a method for actively attenuating acoustic vibrations of a rail for rail traffic.

13 Claims, 3 Drawing Sheets

(58) Field of Classification Search
USPC .......................................... 381/71.2; 181/206
See application file for complete search history.

(56) References Cited

FOREIGN PATENT DOCUMENTS

| | | | |
|---|---|---|---|
| DE | 198 24 125 | C1 | 9/1999 |
| DE | 198 42 345 | A1 | 3/2000 |
| DE | 102006028740 | A1 | 1/2008 |
| DE | 102009044339 | A1 | 4/2011 |
| EP | 0456499 | A2 | 11/1991 |
| EP | 1657362 | A1 | 5/2006 |
| EP | 1 497 164 | B1 | 8/2008 |
| JP | 2014111897 | A | 6/2014 |

* cited by examiner

SYSTEM, METHOD AND SUPPORT ELEMENT FOR ACTIVELY DAMPING ACOUSTIC VIBRATIONS OF A RAIL FOR RAIL TRAFFIC

CROSS-REFERENCE TO RELATED APPLICATIONS

This application claims priority to PCT Application No. PCT/EP2020/078066, having a filing date of Oct. 7, 2020, based on German Application No. 10 2019 127 824.4, having a filing date of Oct. 15, 20219, the entire contents both of which are hereby incorporated by reference.

FIELD OF TECHNOLOGY

The following relates to a system and a method for actively attenuating acoustic vibrations of a rail for rail traffic as well as a carrier element for a rail for rail traffic for actively attenuating acoustic vibrations of the rail by means of the system.

BACKGROUND

Many railway lines pass noise-sensitive areas, for example cities. Particularly at night when many cargo trains are on the way, the people living there are exposed to considerable acoustic pollution. It was even found that rail traffic noise causes medical conditions.

In the speed range of about 40 km/h to about 280 km/h relevant for most rail travel the noise emission of rail travel is determined by the rolling noise generated at the wheel-rail contact. Rolling noise is generated when the wheels roll on the rail track. When rolling, the surface and structural irregularities of the rail and wheel travel surfaces determined by the material structure, wear and corrosion cause predominantly vertical excitations of the wheel sets and rails which induce vibrations in them which are emitted into the surrounding air as airborne noise and into the substructure of the rails as structure-borne noise.

Rail joints, crossing assemblies, flat spots as well as plots of the rails lead to further impulse-like noise allocable to the wheel-rail system.

There are already some passive solution approaches on the market such as, e.g., covers for the rails themselves for reducing the transmission of airborne noise, or attenuation underlays under rails or sleepers to uncouple these components from the ground to reduce the transmission of structure-borne noise to the substructure of the rails. Furthermore, there are also systems incorporated in each wheel of a railway carriage to reduce vibrations causing noise at the wheels themselves.

However, the mentioned passive systems can only reduce the released sound pressure level by up to 3 dB(A), altogether, however, a sound pressure level of far more than 60 dB(A) is to be handled depending on the train speed.

Patent specification EP 1 497 164 B1 describes a method for reducing the sound transmission of rail vehicles. In the process, at least one vibration sensor detects the bothersome vibrations generated and/or transmitted by a wheel set. A device for a frequency analysis of the signals from the at least one vibration sensor identifies frequencies with the most intense harmonic excitations. The residual vibrations transmitted to the carriage body are measured by means of an error sensor. Then, control signals for at least one actuator are generated under consideration of the signals from the at least one error sensor. The at least one actuator minimises the residual vibrations transmitted to the carriage body.

Patent specification DE 198 24 125 C1 discloses a method for actively suppressing undercarriage-related vibrational excitation, particularly airborne noise excitation, in the passenger compartment of rail vehicles. Here, vibration sensors are provided which detect the vibrations of the intermediate frames or of the carriage body above the primary springs. Further, actuators are provided by means of which compensation forces can be applied in parallel to the primary springs respectively allocated to a disk wheel. In the process, a control device generates control signals composed of frequency components of one or more integer multiples of a rotational frequency of the disk wheel for the actuators depending on the vibrations. In the process, the control device determines the phases and amplitudes of the respective frequency components so that the vibrations are minimised, respectively.

Patent application DE 198 42 345 A1 discloses a rail vehicle comprising a vehicle superstructure on which at least one vibration absorber device for an energy-efficient attenuation of vibrations of the vehicle superstructure is provided, the vibration frequency of the vibration absorber device being controlled depending on control signals from at least one vibration sensor allocated to the vehicle superstructure. The vibration absorber device comprises a spring and attenuator element implemented as a hydropneumatic actuator. A passive vibration absorber mass is coupled to the vehicle superstructure via the actuator.

The cited documents describe systems for attenuating vibrations, particularly acoustic vibrations, of the vehicle superstructure of railway carriages resulting in a reduced noise emission of railway carriages. The systems are all fully integrated in the railway carriages so that an effective noise reduction is only achieved when all railway carriages passing a noise-sensitive area are equipped with the above systems. Equipping entire train fleets with the above systems would entail substantial costs.

SUMMARY

An aspect relates to a cost-efficient system and method for effectively reducing noise emissions in rail traffic.

Embodiments of the invention relate to a system for actively attenuating acoustic vibrations of a rail for rail traffic comprising at least one sensor for detecting at least a vertical acoustic vibration of the rail, at least one actuator for exciting at least a vertical counter-vibration of the rail and at least one control unit communicatively connected to the at least one sensor and the at least one actuator for controlling the at least one actuator depending on the vibration detected by the sensor.

Within the meaning of embodiments of the invention, the term "acoustic vibration" refers to a vibration having a frequency in the frequency range audible to humans of 20 Hz to 20 kHz, particularly in the frequency range of the highest hearing sensitivity of 0.5 kHz to 10 kHz.

In an embodiment, the at least one vibration and the at least one counter-vibration respectively comprise a, particularly time-dependent, vibration spectrum or counter-vibration spectrum respectively having a multitude of frequencies and amplitudes which are different from each other.

The at least one vibration of the rail is, for example, caused by the rolling of the wheels of a rail vehicle on the rail and therefore constitutes the source of the wheel-rail noise of the rail vehicle together with vibrations of the wheels.

The at least one sensor may, for example, include a piezoelectric sensor, a magnetic induction sensor and/or a micro-electromechanical sensor attached to the rail. The system may include a sensor implemented as an error sensor for measuring a residual vibration transmitted to a carrier element and/or a substructure of the rail while the vibration is superimposed by the counter-vibration. With the aid of the error sensor, the control unit can advantageously control the counter-vibration in a closed control loop.

The at least one sensor and the at least one actuator are designed for detecting at least a vertical vibration or for exciting a vertical counter-vibration since wheel-rail noise is mainly caused by vertical vibrations of the wheel-rail-system.

The at least one control unit includes a computer device, for example a one-chip system, an embedded computer system, a memory-programmable controller, a network client and/or a network server. The at least one control unit may be communicatively connected to the at least one sensor and/or the at least one actuator in a wireless and/or wired manner.

The counter-vibration is adapted to destructively interfere with the detected vibration. By superimposing the counter-vibration, the vibration of the rail is thus attenuated in accordance with the principle of active noise compensation, and a noise emission of the rail is reduced.

The at least one actuator is mechanically coupled to the rail and to a counterweight stationary relative to a substructure of the rail. Within the meaning of embodiments of the invention, the term “substructure” refers to the entirety of the constructions statically supporting the rail, particularly indirectly via a rail bed. Apart from the spatial forms of the earth body (e.g., terrain, embankment, cut and side-cut), these also include a number of engineering structures (e.g., supporting walls, return and retaining walls, bridges, cross-over structures and passages). The counterweight may be mechanically connected to the substructure and/or fixed in position by the inertia of the counter-weight. Due to the mechanical connection to the counterweight, the actuator can generate a counter-vibration of the rail relative to the substructure.

Due to the fact that the at least one actuator is coupled to the rail and attenuates the vibration of the rail particularly a transmission of structure-borne noise from the rail to the substructure and to its surroundings, for example to nearby buildings, is reduced. Furthermore, also an emission of airborne noise by the rail is reduced, particularly when the substructure includes a bridge structure which may itself be excited to vibrate by structure-borne noise emitted by the rail.

As compared to a system completely integrated in a rail vehicle, an arrangement of the at least one actuator on the rail is advantageous in that it is sufficient for an effective noise reduction in particularly affected areas to only equip the rail sections there with the system according to embodiments of the invention. In this way, lower costs are incurred as compared to a case in which all rail vehicles passing the area would have to be equipped with systems for noise reduction.

Furthermore, if the rail vehicles are operated by different providers, a concerted action of all parties involved would be required to equip all rail vehicles with systems for noise reduction. In contrast, the responsibility for the rail section resides with a single rail network operator so that equipping the section with systems according to embodiments of the invention can be easily implemented as compared to equipping all rail vehicles with systems for noise reduction.

The at least one actuator includes at least one piezoelectric actuator. A piezoelectric actuator is advantageous in that it is particularly low in maintenance and durable which is particularly advantageous for an arrangement on the rail in order not to shorten the maintenance intervals of the rail which are longer as compared to rail vehicles.

The at least one actuator is designed for exciting a counter-vibration of the rail in an appropriate frequency range, amplitude range and output range for compensating typical vibrations generated by the wheel-rail contact of rail vehicles.

The at least one actuator includes at least one stacked piezoelectric actuator. By combining a plurality of piezoelectric actuators of the same or different types to a stacked piezoelectric actuator, the frequency range, amplitude range and/or output range of the actuator for the excitation of the counter-vibration can be configured in a particularly suitable manner.

In particular, the frequency range, amplitude range and/or output range of the stacked actuator can be dynamically adapted to the detected vibration by variably controlling individual actuators of a stacked actuator during the operation of the system.

The counterweight includes a carrier element supporting the rail. In this way, a separate counterweight can be omitted so that the system can be installed in a particularly cost-effective and simple way. For example, the carrier element includes a sleeper, an element, particularly a base, of a so-called solid track and/or an element of the substructure of the rail on which the rail is laid.

In an embodiment, the at least one actuator mechanically connects a lower side of the rail to the carrier element. On the lower side of the rail, a particularly efficient coupling for generating a vertical counter-vibration is possible. In the simplest case, the rail rests directly on the at least one actuator.

The system comprises at least one support element arranged in parallel to the at least one actuator with regard to a force transmission between of the rail and the carrier element for statically supporting the rail. The support element prevents the at least one actuator from being overburdened by a weight force of the rail and, when appropriate, of a rail vehicle thereon.

The support element may, for example, include an attenuation layer, particularly of a fibre-reinforced elastomer as used, for example, as a sole or attenuation underlay of sleepers. The attenuation layer allows for a movement of the rail excited by the actuator and ensures a minimum distance between the rail and the carrier element by finite compressibility to protect the actuator from overburdening.

Furthermore, the attenuation layer reduces a transmission of a portion of the vibration of the rail not cancelled by the counter-vibration to the carrier element. Moreover, the attenuation layer enables biasing the rail on the at least one actuator with the aid of fixation elements. A bias is particularly advantageous in a piezoelectric actuator since a piezoelectric actuator can apply a substantially higher, for example ten times higher force in the pressure direction than in the pull direction. The bias supports a movement of the rail in the pull direction of the actuator and counteracts a movement of the rail in the pressure direction of the actuator.

With regard to a force transmission between the at least one actuator and the carrier element, a pressure reduction element for reducing a pressure applied to the carrier element by the actuator is provided. For example, the pressure reduction element increases a bearing surface of the actuator on the carrier element and thereby reduces the pressure. The pressure reduction element reduces a mechanical load on the carrier element by, for example, local stress concentrations in the carrier element, and thereby increases its durability.

The pressure reduction element comprises, for example, a sleeve, for example of a metal sheet, in which the at least one actuator is at least partly arranged in the carrier element.

The rail is fixed to the carrier element by at least one fixation element. The at least one fixation element comprises, for example, a fixation clamp for pressing the rail onto the carrier element and/or a superstructure W, a superstructure K or a superstructure KS which are known from track construction.

In an embodiment, the at least one actuator is, with regard to a force transmission between the rail and the carrier element, arranged in series with the fixation element, and/or the actuator replaces the fixation element. An arrangement of the at least one actuator on the fixation element or instead of the fixation element has the advantage of an easier accessibility than in case of an arrangement on the lower side of the rail, whereby the installation and maintenance of the actuator and particularly retrofitting an existing rail with the actuator is facilitated.

In an embodiment, at least one attenuation element for attenuating a transmission of vibrations from the rail to the carrier element with regard to a force transmission between the rail and the carrier element is arranged in series with the fixation element, and/or the fixation element itself is designed for attenuating a transmission of vibrations from the rail to the carrier element, for example, by an appropriate form and/or material selection.

The attenuation element may, for example, include an attenuation layer, particularly of a fibre-reinforced elastomer as used, for example, as a sole or an attenuation underlay of sleepers. The attenuation layer reduces a transmission of a portion of the vibration of the rail not cancelled by the counter-vibration to the carrier element.

When the at least one actuator is arranged in series with the fixation element, no attenuation element is arranged in series with the same fixation element, and the fixation element itself is not designed to be vibration attenuating so that an excitation of the rail to the counter-vibration is not attenuated by the actuator.

The at least one sensor is designed for detecting a horizontal vibration of the rail transverse to a longitudinal axis of the rail, and the at least one actuator is designed for exciting a horizontal counter-vibration of the rail transverse to a longitudinal axis of the rail. In this way, advantageously, in addition to vertical vibrations, also horizontal vibrations of the rail transverse to the longitudinal axis of the rail can be actively attenuated to achieve a comprehensive noise reduction, particularly in a curve of the rail.

The at least one actuator includes at least one first actuator having a first axis of movement and a second actuator having a second axis of movement, the first axis of movement and the second axis of movement not being oriented in parallel to each other, orthogonal to each other. By superimposing movements of the two actuators, and potential further actuators, counter-vibrations of the rail in different directions, particularly horizontal ones transverse to the rail and vertical ones can be excited. The two or more actuators may be combined to a stacked actuator.

The at least one sensor comprises at least one first sensor having a first measurement axis and a second sensor having a second measurement axis, the first measurement axis and the second measurement axis not being oriented in parallel to each other, orthogonal to each other. With the two sensors and potential further sensors, vibrations of the rail in different directions, particularly horizontal ones transverse to the rail, and vertical ones can be detected.

The system comprises at least one energy supply unit for supplying the system with energy, the energy supply unit comprising at least one power generation element for local power generation, including a photovoltaic element and/or a piezoelectric element, and at least one energy storage, for example an accumulator for storing the energy generated by the power generation element.

With the energy supply unit, an expensive connection of the system to an external power supply, for example to a municipal power grid or to a railway power grid can be omitted.

The photovoltaic element may, for example, be arranged on a noise protection wall. The piezoelectric element may, for example, be coupled to the rail for converting vibrations of the rail induced by a rail vehicle into electric power.

The system comprises at least one transmission element for a force transmission between the at least one actuator and the rail, the transmission element comprising a redirecting element for redirecting an effective direction of the transmitted force, a translation element for translating the transmitted force and/or an overload protection for limiting the transmitted force.

With the aid of a redirecting element, for example a lever system and/or a wedge deflection, the at least one actuator may, for example, act on the lower side of the rail without having to be arranged directly under the rail. In this way, the actuator is protected from overburdening, for example by a weight force of the rail and a rail vehicle travelling thereon, and it is more easily accessible, for example for installation, maintenance and/or retrofitting.

An overload protection, for example a sliding clutch, also protects the actuator from overburdening, for example by a weight force of the rail and a rail vehicle travelling thereon.

The transmission element may be designed for mechanically coupling a plurality of actuators having, for example, different axes of movement to the rail.

A particular advantage of the system is that it can be designed so that it does not impair common maintenance work on the rail, for example grinding an upper side of the rail or a replacement of the rail, for example by arranging the at least one actuator and the at least one sensor under the rail. In this way, the system is different from, for example, known systems for noise reduction in which noise absorbers are directly attached to the rail.

Embodiments of the invention relate to a carrier element for a rail for rail traffic for actively attenuating acoustic vibrations of the rail including a system according to embodiments of the invention and a system according to embodiments of the invention including such a carrier element.

For example, the carrier element includes a sleeper for laying the rail on a gravel bed, or an element, particularly a base, of a so-called solid track for laying the rail. The carrier element may have features of sleepers customary according to the state of the art or elements of the solid track, for example with regard to the shape, dimensions, material composition and/or fixation elements for the rail. This leads to the advantage that the carrier element can be installed and uninstalled rapidly and cost-effectively using devices and methods customary according to the state of the art, particularly using an automated rail construction train.

The at least one actuator of the system is at least partly integrated in the carrier element, for example arranged under the rail in a recess of the carrier element. In addition, other components of the system, for example the at least one sensor, the at least one control unit, a supply unit and/or a transmission element, may also be at least partly integrated in the carrier element. With an integration or at least partial integration of the system in the carrier element, the system may be installed together with the carrier element in a particularly simple and fast manner.

The carrier element includes at least one service access for maintenance and/or for a replacement of the at least one actuator in an installed state of the carrier element supporting the rail. For example, the service access includes a closable opening on an upper side of the carrier element adjacent to the rail.

Through the service access, the at least one actuator, and, where applicable, other components of the system integrated in the carrier element can be maintained, exchanged or retrofitted without demounting the carrier element or the rail for this purpose.

The carrier element may first be mounted in a rail traffic path without the components of the system according to embodiments of the invention to fulfil the function of a carrier element customary according to the state of the art there without significant additional costs. When required, a system according to embodiments of the invention can then be retrofitted with little effort.

The carrier element may, for example, also be first mounted with only an actuator for exciting a vertical counter-vibration and later be retrofitted with a further actuator for exciting a horizontal counter-vibration.

Embodiments of the invention relate to a rail traffic path with at least one rail, particularly at least two rails, comprising at least one system according to embodiments of the invention for actively attenuating acoustic vibrations of the at least one rail.

The system comprises a number, particularly a plurality of sensors spaced apart along the rail and a multitude of actuators spaced apart along the rail, the number of the sensors being smaller than that of the multitude of the actuators.

Owing to the good sound conduction along the rail, the number of the sensors for detecting vibrations of the rail can be selected so that it is smaller than that of the multitude of the actuators for generating counter-vibrations without substantially compromising the detection quality. The vibrations detected by the sensors can be analysed by a single control unit or also by a plurality of control units for controlling the actuators.

Embodiments of the invention relate to a method for actively attenuating acoustic vibrations of a rail for rail traffic, particularly including a system according to embodiments of the invention, comprising at least the following steps performed by at least one control unit:

a) automatically detecting at least a vertical vibration of the rail by means of at least one sensor,
b) automatically exciting at least a vertical counter-vibration of the rail by means of at least one actuator,
c) wherein the counter-vibration is adapted to destructively interfere with the detected vibration, and
d) wherein the at least one actuator is mechanically coupled to the rail and to a carrier element supporting the rail.

Design options and advantages of the method emerge in analogy to the system according to embodiments of the invention.

The counter-vibration can be calculated by the control unit based on the detected vibration using methods known from the field of active noise compensation. Alternatively, the detected vibration can be used by the control unit to detect an arrival of a train and a train type of the arriving train.

As soon as the arrival of a train was detected, the control unit may control the at least one actuator, for example for exciting a general counter-vibration, the general counter-vibration being adapted to destructively interfere with of a vibration of the rail usually generated by a train travelling on the relevant rail. The use of a general counter-vibration has the advantage that no counter-vibration needs to be recalculated for each arriving train so that the control unit can be configured so that it is less high-performing and more cost-effective. The general counter-vibration may be determined by a self-learning algorithm, for example, based on previously detected vibrations.

In an embodiment, the control unit controls the at least one actuator to excite a train type-specific counter-vibration as soon as the arrival of a train of a specific train type is detected. Here, the train type can be determined from the detected vibration and/or based on an arrival time and a comparison with a train schedule. The use of a train type-specific counter-vibration is less computationally expensive than a calculation of the counter-vibration based on the detected vibration and enables a more intense attenuation than a general counter-vibration. The train type-specific counter-vibration may, for example, be determined by a self-learning algorithm based on vibrations previously detected in connection with the associated train types.

The control unit may use at least one sensor of the system as an error sensor to measure a residual vibration transmitted to a carrier element and/or a substructure of the rail during the excitation of the counter-vibration. In an embodiment, the control unit controls the counter-vibration in a closed control loop so that the residual vibration is minimised.

The method comprises at least the following steps performed by the at least one control unit:

a) automatically detecting at least a horizontal vibration of the rail by means of at least one sensor,
b) automatically exciting at least a horizontal counter-vibration of the rail by means of the at least one actuator,
c) wherein the counter-vibration is adapted to destructively interfere with the detected vibration.

A particular advantage of embodiments of the invention is counteracting the rail traffic noise where it is generated. In this wayless space is required for the construction of rail traffic tracks—since large noise protection walls become obsolete.

Reduced vibrations in the rails may, moreover, reduce the wear of wheels and rails. Owing to a reduced wear of the wheels, wheel-rail noise can also be reduced on route sections not including a system according to embodiments of the invention.

A traffic ban for trains at night can ideally be omitted by reduced noise emissions so that more trains can travel through noise-sensitive areas. Living close to rail traffic tracks is much more attractive owing to reduced noise emissions. This will increase the acceptance of rail traffic as an efficient and environmentally friendly logistics system.

BRIEF DESCRIPTION

Some of the embodiments will be described in detail, with references to the following Figures, wherein like designations denote like members, wherein.

DETAILED DESCRIPTION

Figure 1:
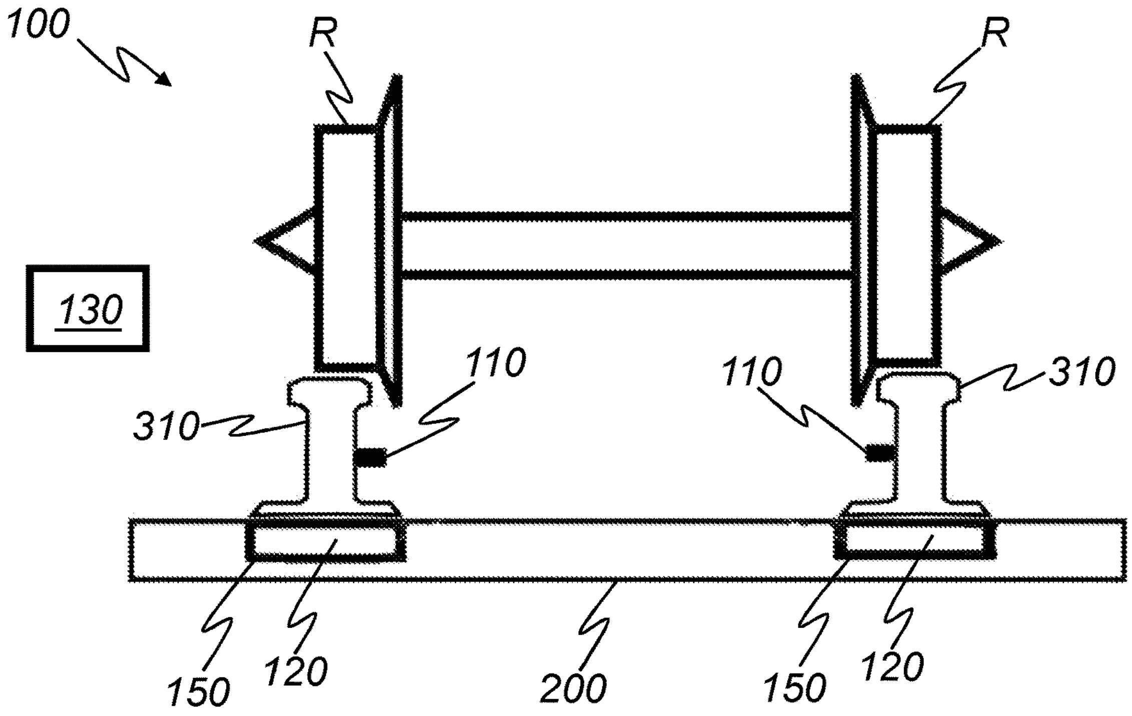
FIG. 1 shows a schematic illustration of a system according to embodiments of the invention.

FIG. 1 shows a schematic illustration of a system 100 according to embodiments of the invention for actively attenuating acoustic vibrations of at least one rail 310 for rail traffic. In FIG. 1, two parallelly extending rails 310 of a rail track with two wheels R of a rail vehicle resting thereon are illustrated by way of example.

For example, the system 100 comprises respectively one sensor 110, for example a piezoelectric sensor, for detecting a vertical acoustic vibration of each rail 310, respectively one actuator 120, for example a piezoelectric actuator, for exciting a vertical counter-vibration of the rail 310, and a control unit 130 communicatively connected to the sensors 110 and the actuators 120 (connections not illustrated), for example an embedded computer system for controlling the actuators 120 depending on the vibrations detected by the sensors 110.

The actuators 120 are mechanically coupled to the respective rail 310 and to a carrier element 200 supporting the rail 310, for example a sleeper, and mechanically connect, for example, a lower side of the respective rail 310 to the carrier element 200.

The illustrated system 100 comprises a support element 150 arranged in parallel to the actuator 120 with regard to a force transmission between the rail 310 and the carrier element 200 for statically supporting the rail 310, respectively.

The support element 150 comprises, for example, an attenuation underlay of an elastomer in which the respective actuator 120 can be integrated.

Figure 2:
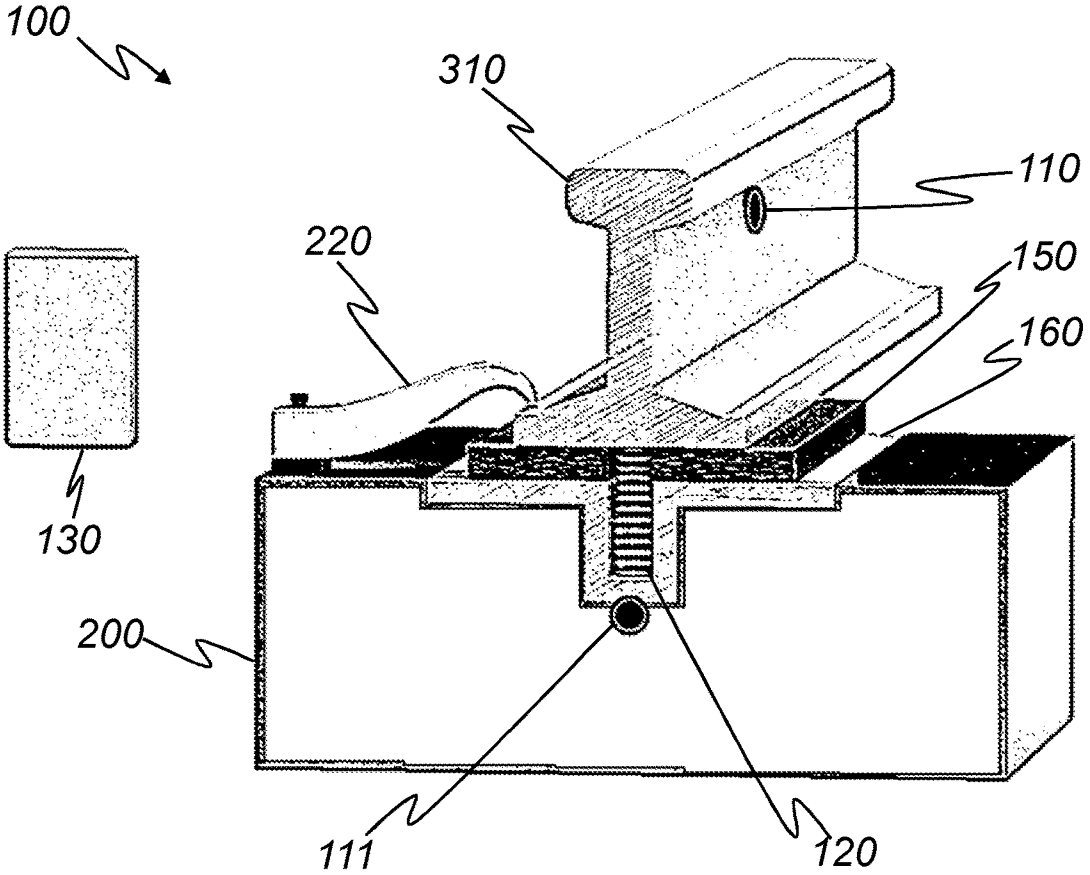
FIG. 2 shows another schematic illustration of a system according to embodiments of the invention.

FIG. 2 shows another schematic illustration of a system 100 according to embodiments of the invention.

In contrast to FIG. 1, only one rail 310 with a sensor 110 and an actuator 120 respectively arranged thereon is shown in FIG. 2.

Moreover, also a fixation element 220, for example a fixation clamp pressing the rail 310 onto the carrier element 200 is shown. The fixation element 220 may, in particular, generate a compressive bias on the actuator 120 disposed under the rail 310 in a support element 150, for example in an attenuation underlay of an elastomer.

The illustrated system 100 comprises a pressure reduction element 160, for example a metal sleeve, arranged so as to limit a pressure applied to the carrier element 200 by the actuator 120 with regard to a force transmission between the actuator 120 and the carrier element 200.

The illustrated system 100 comprises an error sensor 111 for measuring a residual vibration transmitted to the carrier element 200.

Figure 3:
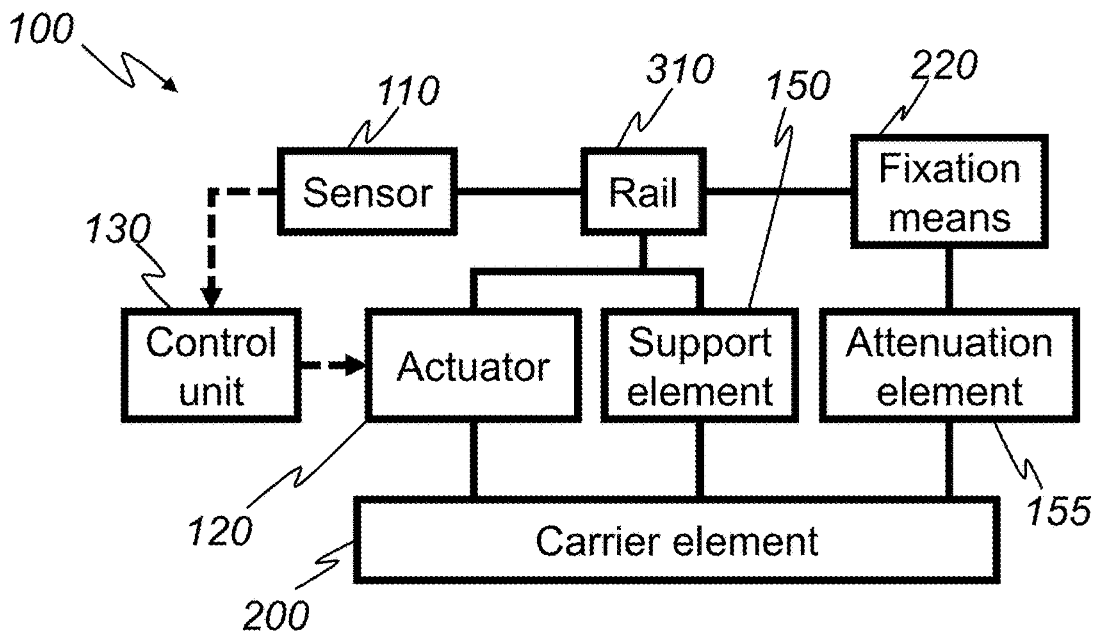
FIG. 3 shows another schematic illustration of a system according to embodiments of the invention.

FIG. 3 shows another schematic illustration of a system 100 according to embodiments of the invention for actively attenuating acoustic vibrations of at least one rail 310 for rail traffic.

The system 100 comprises, for example, a sensor 110, for example a piezoelectric sensor, for detecting a vertical acoustic vibration of the rail 310, an actuator 120, for example a piezoelectric actuator, for exciting a vertical counter-vibration of the rail 310, and a control unit 130 communicatively connected to the sensors 110 and the actuators 120, for example an embedded computer system for controlling the actuator 120 depending on the vibration detected by the sensor 110. The communicative connections are shown as dotted lines.

The actuator 120 is mechanically coupled to the rail 310 and to a carrier element 200 supporting the rail 310, for example a sleeper, and mechanically connects, for example, a lower side of the rail 310 to the carrier element 200. These and the mechanic connections described below are shown as solid lines.

The illustrated system 100 comprises a support element 150 arranged in parallel to the actuator 120 with regard to a force transmission between the rail 310 and the carrier element 200 for statically supporting the rail 310.

The support element 150 comprises, for example, an attenuation underlay of an elastomer in which the actuator 120 may be integrated.

The rail 310 is fixed to the carrier element 200 by at least one fixation element 220. The at least one fixation element 220 includes, for example, a superstructure W, a superstructure K, or a superstructure KS which are known from track construction.

With regard to a force transmission between of the rail 310 and the carrier element 200, at least one attenuation element 155 for attenuating a transmission of vibrations from the rail 310 to the carrier element 200 is arranged in series with the fixation element 220.

The attenuation element 155 may, for example, include an attenuation layer, particularly of a fibre-reinforced elastomer.

Figure 4:
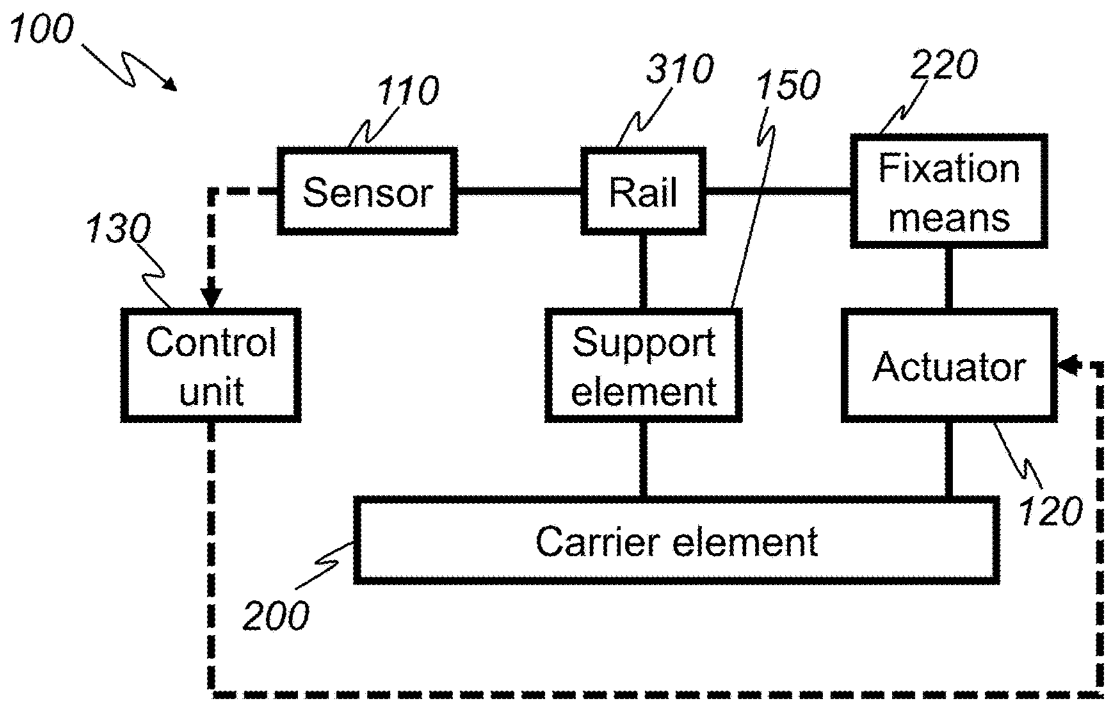
FIG. 4 shows another schematic illustration of a system according to embodiments of the invention.

FIG. 4 shows another schematic illustration of a system 100 according to embodiments of the invention.

The system 100 illustrated in FIG. 4 differs from the system 100 illustrated in FIG. 3 in that the actuator 110 does not mechanically connect the lower side of the rail 310 to the carrier element 200, but is, with regard to a force transmission between the rail 310 and the carrier element 200, arranged in series with the fixation element 220.

According to embodiments of the invention, a combination of at least one actuator 110 arranged in accordance with FIG. 3 and at least one actuator 110 arranged in accordance with FIG. 4 which is not illustrated is also possible.

When an actuator 110 is arranged in series with the fixation element 220, no attenuation element 155 is arranged in series with the same fixation element 220.

Figure 5:
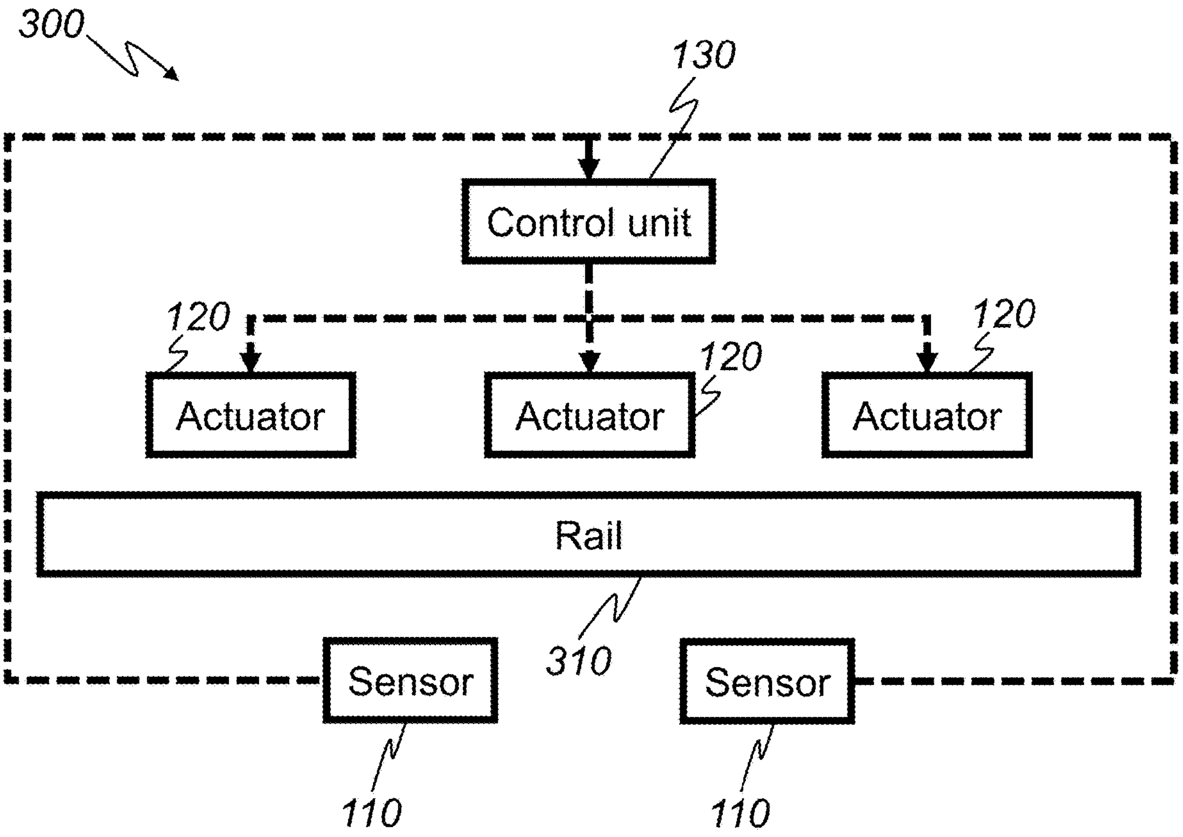
FIG. 5 shows a schematic illustration of a rail traffic track according to embodiments of the invention.

FIG. 5 shows a schematic illustration of a rail traffic track 300 according to embodiments of the invention including at least one rail 310 and at least one system 100 according to embodiments of the invention for actively attenuating acoustic vibrations of the at least one rail 310. The system 100 comprises a plurality of sensors 110 spaced apart along the rail 310 (by way of example, two sensors 110 are shown) and a multitude of actuators 120 spaced apart along the rail 310 (by way of example, three actuators 120 are shown), the plurality of the sensors 110 being fewer than the multitude of the actuators 120.

The system 100 comprises a control unit 130 communicatively connected to the sensors 110 and the actuators 120. The communicative connections are shown as dotted lines.

Other components of the system 100 are not shown for the sake of clarity.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| List of reference numerals | |
|---|---|
| 100 | System |
| 110 | Sensor |
| 111 | Error sensor |
| 120 | Actuator |
| 130 | Control unit |
| 150 | Support element |
| 155 | Attenuation element |
| 160 | Pressure reduction element |
| 200 | Carrier element |
| 220 | Fixation means |
| 300 | Rail traffic path |
| 310 | Rail |
| R | Wheel |

The invention claimed is:

1. A rail traffic path comprising a rail for rail traffic, a counterweight stationary relative to a substructure of the rail, and a system for actively attenuating acoustic vibrations of the rail, the system comprising:

a) at least one sensor for detecting at least a vertical acoustic vibration of the rail, b) at least one actuator for exciting at least a vertical counter-vibration of the rail, and c) at least one control unit communicatively connected to the at least one sensor and the at least one actuator for controlling the at least one actuator depending on the vibration detected by the sensor, d) wherein the counter-vibration is adapted to destructively interfere with the detected vibration, and e) wherein the at least one actuator is mechanically coupled to the rail and to the counterweight, wherein f) the at least one sensor is configured for detecting a horizontal vibration of the rail transverse to a longitudinal axis of the rail, and g) the at least one actuator is configured for exciting a horizontal counter-vibration of the rail transverse to a longitudinal axis of the rail.

2. The rail traffic path according to claim 1, wherein the at least one actuator comprises at least one piezoelectric actuator, or at least one stacked piezoelectric actuator.

3. The rail traffic path according to claim 1, wherein the counterweight comprises a carrier element supporting the rail.

4. The rail traffic path according to claim 3, wherein the at least one actuator mechanically connects a lower side of the rail to the carrier element.

5. The rail traffic path according to claim 4, further comprising at least one support element arranged in parallel to the at least one actuator with regard to a force transmission between the rail and the carrier element for statically supporting the rail.

6. The rail traffic path according to claim 3, wherein with regard to a force transmission between the at least one actuator and the carrier element, a pressure reduction element for reducing a pressure applied to the carrier element by the actuator is provided.

7. The rail traffic path according to claim 3, wherein the rail is fixed to the carrier element by at least one fixation element, wherein, with regard to a force transmission between the rail and the carrier element, the at least one actuator is arranged in series with the fixation element.

8. The rail traffic path according to claim 3, wherein the at least one actuator of the system is at least partly integrated in the carrier element supporting the rail.

9. The rail traffic path according to claim 8, wherein the carrier element comprises at least one service access for maintenance and/or replacement of the at least one actuator in an installed state of the carrier element supporting the rail.

10. The rail traffic path according to claim 1, wherein the at least one actuator comprises at least a first actuator having a first axis of movement and a second actuator having a second axis of movement, wherein the first axis of movement and the second axis of movement are not oriented in parallel to each other.

11. The rail traffic path according to claim 1, further comprising at least one transmission element for a force transmission between the at least one actuator and the rail, wherein the transmission element comprises a redirecting element for redirecting an effective direction of the transmitted force, a translation element for translating the transmitted force and/or an overload protection for limiting the transmitted force.

12. The rail traffic path according to claim 1, wherein the system comprises a number of sensors spaced apart along the rail and a multitude of actuators spaced apart along the rail.

13. A method for actively attenuating acoustic vibrations of the rail for rail traffic of the rail traffic path according to claim 1, comprising at least the following steps performed by the at least one control unit of the system for actively attenuating acoustic vibrations of the rail of the rail traffic path:

a) automatically detecting at least a vertical vibration of the rail by the at least one sensor of the system, b) automatically exciting at least a vertical counter-vibration of the rail by the at least one actuator of the system, c) wherein the vertical counter-vibration is configured to destructively interfere with the detected vertical vibration, and d) wherein the at least one actuator is mechanically coupled to the rail and to the counterweight stationary relative to the substructure of the rail, wherein at least the following steps are performed by the at least one control unit:

e) automatically detecting at least a horizontal vibration of the rail transverse to the longitudinal axis of the rail by the at least one sensor, f) automatically exciting at least a horizontal counter-vibration of the rail transverse to the longitudinal axis of the rail by the at least one actuator, g) wherein the horizontal counter-vibration is configured to destructively interfere with the detected horizontal vibration.

* * * * *